US010007553B2

(12) United States Patent
Bru et al.

(10) Patent No.: US 10,007,553 B2
(45) Date of Patent: Jun. 26, 2018

(54) METHOD FOR CONFIGURING AN IT SYSTEM, CORRESPONDING COMPUTER PROGRAM AND IT SYSTEM

(75) Inventors: Xavier Bru, Claix (FR); Philippe Garrigues, Montbonnot Saint-Martin (FR); Benoît Welterlen, Grenoble (FR)

(73) Assignee: BULL SAS, Les Clayes-Sous-Bois (FR)

( * ) Notice: Subject to any disclaimer, the term of this patent is extended or adjusted under 35 U.S.C. 154(b) by 984 days.

(21) Appl. No.: 13/583,921

(22) PCT Filed: Mar. 10, 2011

(86) PCT No.: PCT/FR2011/050489
§ 371 (c)(1),
(2), (4) Date: Nov. 21, 2012

(87) PCT Pub. No.: WO2011/110790
PCT Pub. Date: Sep. 15, 2011

(65) Prior Publication Data
US 2013/0067482 A1 Mar. 14, 2013

(30) Foreign Application Priority Data

Mar. 11, 2010 (FR) ...................... 10 51758

(51) Int. Cl.
*G06F 9/46* (2006.01)
*G06F 9/48* (2006.01)
*G06F 9/38* (2018.01)
*G06F 9/445* (2018.01)

(52) U.S. Cl.
CPC .......... *G06F 9/4843* (2013.01); *G06F 9/3851* (2013.01); *G06F 9/44568* (2013.01)

(58) Field of Classification Search
CPC ... G06F 9/4843; G06F 9/3851; G06F 9/44568
See application file for complete search history.

(56) References Cited

U.S. PATENT DOCUMENTS

| | | | | |
|---|---|---|---|---|
| 6,886,081 | B2 * | 4/2005 | Harres | 711/152 |
| 7,543,294 | B2 * | 6/2009 | Hirase | G06F 9/4881 710/10 |
| 9,715,411 | B2 * | 7/2017 | Doing | G06F 9/5027 |

(Continued)

FOREIGN PATENT DOCUMENTS

EP 1 890 225 A1 2/2008

OTHER PUBLICATIONS

Shin et al., "Dynamic Scheduling Issues in SMT Architectures", IEEE Parallel and Distributed Processing Symposium, Apr. 22-26, 2003, pp. 77-84.

*Primary Examiner* — Camquy Truong
(74) *Attorney, Agent, or Firm* — Pillsbury Winthrop Shaw Pittman LLP

(57) ABSTRACT

A method designed to configure an IT system having at least one computing core for executing instruction threads, in which each computing core is capable of executing at least two instruction threads at a time in an interlaced manner, and an operating system, being executed on the IT system, capable of providing instruction threads to each computing core. The method includes a step of configuring the operating system being executed in a mode in which it provides each computing core with a maximum of one instruction thread at a time.

9 Claims, 2 Drawing Sheets

(56) References Cited

U.S. PATENT DOCUMENTS

| | | | |
|---|---|---|---|
| 2004/0123078 A1* | 6/2004 | Hum | G06F 9/3004 |
| | | | 712/217 |
| 2004/0215939 A1 | 10/2004 | Armstrong | |
| 2006/0242442 A1* | 10/2006 | Armstrong | G06F 1/14 |
| | | | 713/400 |
| 2007/0130569 A1* | 6/2007 | Heffley | G06F 9/4812 |
| | | | 718/108 |
| 2007/0266224 A1* | 11/2007 | Gross | G06F 9/3851 |
| | | | 712/214 |
| 2007/0283137 A1* | 12/2007 | Ueltschey | G06F 9/4405 |
| | | | 713/1 |

* cited by examiner

METHOD FOR CONFIGURING AN IT SYSTEM, CORRESPONDING COMPUTER PROGRAM AND IT SYSTEM

FIELD OF THE INVENTION

This invention relates to a method for configuring an IT system, and a corresponding computer program and IT system.

The invention applies more specifically to a computer system comprising at least one processor itself including at least one computing core implementing technology for simultaneously executing a plurality of instruction threads, called SMT (Simultaneous Multi-Threading) technology, for example, the "hyper threading" (registered trademark) technology of the Intel company.

BACKGROUND OF THE INVENTION

The terminology below will be used in the present description as well as in the claims.

An "IT system" is a system designed to execute computer program instructions and to this end comprises at least one central processing unit, also called a processor or CPU (Central Processing Unit). In order of increasing complexity, an IT system according to the invention may consist of a simple microcomputer comprising one or more microprocessors with one or more computing cores, or a more complex assembly in which a plurality of microcomputers are interconnected via a data transmission network. The complexity of an IT system in which the invention can be implemented is dependent primarily on the intended use.

A "microprocessor" is a processor implemented on a very limited number of integrated circuits, generally only one. Because microprocessors are so popular, they are generally simply called processors or CPUs.

It should be noted that a processor may comprise one or more computing cores. A "single-core processor" is thus a processor (microprocessor) including a single computing core, and a "multi-core processor" is a processor (microprocessor) including a plurality of computing cores that share certain elements in common, generally a cache memory, for example the so-called level 2 (L2) cache.

A computing core is the part of the processor (microprocessor) performing the computations corresponding to the executed instructions. A computing core generally includes one or more control units as well as one or more integer computing units and one or more floating-point computing units.

A "computer program", or more simply a "program", is a set of instructions intended to be executed by a processor.

A "process" is a program being executed. A process may comprise only one instruction thread (the process is then sometimes called a "heavy process"), or comprise multiple instruction threads (said threads sometimes called "lightweight processes") sharing common resources, generally memory, and capable of being executed asynchronously.

An "instruction thread" (or thread) is a series of instructions that a computing core executes one after another.

A "BIOS" (Basic Input Output System) is a program launched at the beginning of the start-up of an IT system, before the operating system is launched.

An "operating system" is a program executed on an IT system and producing the interface between the IT system and other programs executed on this IT system, generally "application programs", i.e. programs intended to be controlled by a user and generally intended to be launched by the latter.

A "daemon" is a process intended to be executed in the background, i.e. that is not under the direct control of the user. Daemons are often launched by the operating system.

By contrast with daemons, an "application process" is an application program being executed.

A "shell" is a program providing an interface for the user for accessing services offered by the operating system.

A "script" is an interpreted program, i.e. including instructions interpreted by another program that converts them into instructions for the processor.

A "shell-script" is therefore a script comprising instructions intended to be interpreted by a shell.

A "logic processor" is a processor seen by the operating system. Thus, a processor that is physically present appears in the form of one or more logic processors to the operating system according to its architecture and/or its configuration. In particular, a single-core processor in single-threading mode capable of processing a single instruction thread at a time appears as a single logic processor, and a multi-core processor in which each core is capable of processing a single thread of instructions at a time appears in the form of as many logic processors as there are cores.

There are currently processors, single-core or multi-core, in which each computing core implements SMT technology so as to be capable of executing at least two instruction threads at a time in an interlaced manner.

For example, the Intel company sells processors capable of operating selectively in "hyper-threading" mode, in which each computing core is capable of executing two instruction threads at a time in an interlaced manner, or in "single-threading" mode, in which each computing core is capable of executing only one instruction thread at a time.

In addition, most modern operating systems are designed to manage a plurality of logic processors and are therefore capable of providing instruction threads to each computing core physically present.

To enable such an operating system to take advantage of the hyper-threading mode without requiring it to be modified, each core in hyper-threading mode appears in the form of two logic processors to the operating system. The latter can therefore provide two processes to each computing core in hyper-threading mode by using its usual mechanisms for managing the logic processors.

Some programs are designed to take advantage of the hyper-threading mode: this is the case in particular of programs producing, during their execution, a multi-programmed process including two instruction threads that use different resources of a computing core.

It has been observed that certain programs have optimal performance in one mode, but degraded performance in the other mode.

It would thus be desirable to adapt the mode of operation—single-threading or hyper-threading or more generally SMT—of the processor computing cores according to the type of program to be executed.

However, at present, the only means known for going from one mode to the other is to modify a parameter of the BIOS. This requires a first restart of the IT system in order to access the BIOS in order to configure it, and a second restart so that the BIOS thus configured is executed. There are IT tools enabling the BIOS parameters to be modified under the control of the IT system. However, the second restart of the system remains necessary. Thus, these solutions involve a significant loss of time and are, in practice, too cumbersome to be useful.

It may thus be desirable to provide a method for configuring an IT system that enables at least some of the aforementioned problems and constraints to be overcome.

SUMMARY OF THE INVENTION

Thus, the invention relates to a method for configuring an IT system comprising at least one computing core for executing instruction threads, in which each computing core is capable of executing at least two instruction threads at a time in an interlaced manner, and an operating system, being executed on the IT system, capable of providing instruction threads to each computing core, wherein the method is characterized in that it comprises a step of configuring the operating system being executed in a mode in which it provides, to each computing core, a maximum of one instruction thread at a time.

The invention makes it possible to dynamically require each computing core to process only one instruction thread at a time, in spite of its hyper-threading mode or more generally SMT mode configuration. It is thus possible to dynamically go from the SMT mode to the mode in which each core processes a maximum of one instruction thread at a time, under the direct control of the operating system, without a restart being necessary. The IT system can thus execute, on computing cores in SMT mode and with high performance, a program normally having optimal performance when it is executed on computing cores in single-threading mode. The invention is especially effective with computing cores having substantially identical capacities in single-threading mode and in SMT mode with a single instruction thread being executed.

Optionally, the method further comprises, while the operating system being executed is configured in the so-called first mode, in which it provides each computing core a maximum of one instruction thread at a time, a step of configuring the operating system being executed in a second mode, different from the first mode, in which it can provide each computing core with more than one instruction thread at a time.

It is thus possible again to effectively execute a program normally having optimal performance when it is executed on computing cores in SMT mode.

Also optionally, each computing core is designed so as to provide the operating system being executed with as many logic processors as there are instruction threads that it can execute at a time in an interlaced manner, the operating system being executed comprises a list of logic processors available for scheduling the instruction threads, in which list all of the logic processors of each computing core are located, and the method further comprises, for configuring the operating system being executed so that it provides each computing core with a maximum of one instruction thread at a time, a step of transmitting, to the operating system being executed, an instruction to remove all of the logic processes except for one of each computing core from the list of logic processors available for scheduling.

Thus, the operating system is very simply configured so as to provide only a maximum of one instruction thread to each computing core.

Also optionally, the method further comprises, for configuring the operating system being executed so that it provides each computing core with more than one instruction thread at a time, a step of transmitting, to the operating system being executed, an instruction to add all of the logic processes that were removed to the list of logic processors available for scheduling.

Thus, the operating system is very simply configured so as to be capable of providing more than one instruction thread to each computing core.

Also optionally, the IT system comprises, as a computing core or cores, only one or more computing core(s) capable of executing at least two instruction threads at a time in an interlaced manner.

Also optionally, each computing core is capable of executing exactly two instruction threads at a time in an interlaced manner.

Thus, the process is suitable for the particular case of hyper-threading.

The invention also relates to a computer program that can be downloaded from a communication network and/or recorded on a computer-readable medium and/or capable of being executed by a processor, characterized in that it includes instructions for executing steps of a configuration process according to the invention, when said program is executed on a computer.

Optionally, the computer program is in the form of a shell-script.

Also optionally, the computer program is in the form of at least one function of an IT library intended to be called by another program.

The invention also relates to an IT system comprising:
at least one computing core for executing instruction threads, in which each computing core is capable of executing at least two instruction threads at a time in an interlaced manner, and
a memory in which an operating system is recorded, which, when executed by the IT system, is capable of providing instruction threads to each computing core, characterized in that it comprises:
a memory in which a computer program is recorded, including instructions for, when executed by the IT system while the operating system is being executed by the IT system, configuring the operating system being executed in a mode in which it provides each computing core with a maximum of one instruction thread at a time.

BRIEF DESCRIPTION OF THE DRAWINGS

The invention will be easier to understand in view of the following description, provided solely as an example and with reference to the appended drawings, in which.

DETAILED DESCRIPTION

Figure 1:
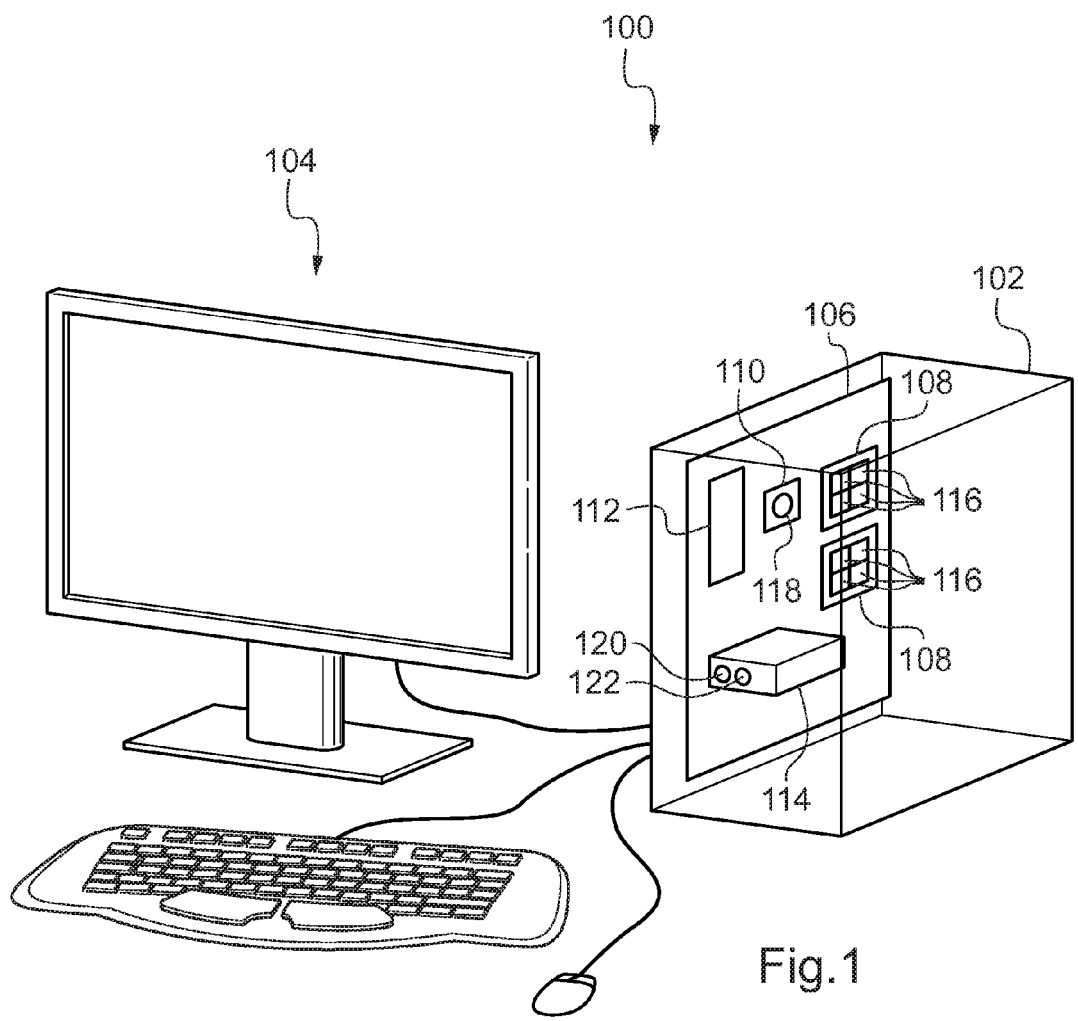
FIG. 1 diagrammatically shows an IT system according to an embodiment of the invention.

FIG. 1 shows an example of an embodiment of the invention, in the form of a computer 100.

The computer 100 comprises a central unit 102 and a human-machine interface 104, for example a screen, a keyboard and a mouse.

The central unit 102 comprises a motherboard 106 and, connected to the motherboard 106, two Xeon X5570 (registered trademark) processors 108, a BIOS memory 110, a random access memory 112 and a storage memory 114, such as a hard disk. The processors 108 are thus capable of executing the instructions recorded in the BIOS memory 110 and the random access memory 112, and of reading or writing data recorded in the storage memory 114.

In the example shown in FIG. 1, each processor 108 comprises four computing cores 116 for executing instruction threads. Each processor 108 is capable of operating selectively in single-threading mode, in which each computing core 116 is capable of executing a single instruction thread at a time and appears, in particular for the operating system, in the form of a single logic processor, or in hyper-threading mode, in which each computing core 116 is capable of executing two instruction threads at a time in an interlaced manner, and appears, in particular for the operating system, in the form of two logic processors.

A BIOS 118 is recorded in the BIOS memory 110. The BIOS 118 can be configured, by means of a predetermined configuration parameter, to start the processors 108 in single-threading mode or in hyper-threading mode. In the latter case, the BIOS 118 is configured so as to start two logic processors for each computing core 116, respectively called first and second logic processors. In single-threading mode, the BIOS 118 starts only the first logic processor.

In addition, the BIOS 118 complies with the ACPI ("Advanced Configuration and Power Interface") standard. This standard specifies in particular that the execution of the BIOS 118 must create a list of logic processors present, i.e. those that were started. This list is created in a table, called MADT table ("Multiple APIC Description Table") recorded in the random access memory 112 and intended to be read by the operating system when it is being executed so that it is aware of the logic processors present. The MADT table further indicates, for each logic processor, whether the latter corresponds to the core of a single-core processor, to one of the cores of a multi-core processor, and/or to one of the logic cores of a physical core in hyper-threading mode. Thus, the MADT table gives the configuration of the processor(s) of the computer 100. On recent Intel (registered trademark) processors, this information is provided by the "cpuid" instruction.

The ACPI standard further specifies that the second logic processors of all of the computing cores 116 must be placed in the list after the first logic processors of all of the computing cores 116. Thus, the list includes a first half combining the first logic processors of the computing cores 116 and a second half combining the second logic processors of the computing cores 116.

An operating system 120 is recorded in the storage memory 114. The operating system 120 is in particular designed so as to provide, when it is executed by the computer 100, instruction threads to each computing core 116. In the example described, the operating system 120 complies with the Unix (registered trademark) standard. It is, for example, the Linux (registered trademark) operating system.

A shell-script 122, of which the code is provided in the appendix, is also recorded in the storage memory 114. The shell-script 122 is intended to configure the operating system 120 to go from the hyper-threading mode, or more generally the SMT mode, to a "simulated single-threading" mode, as will be explained below.

Figure 2:
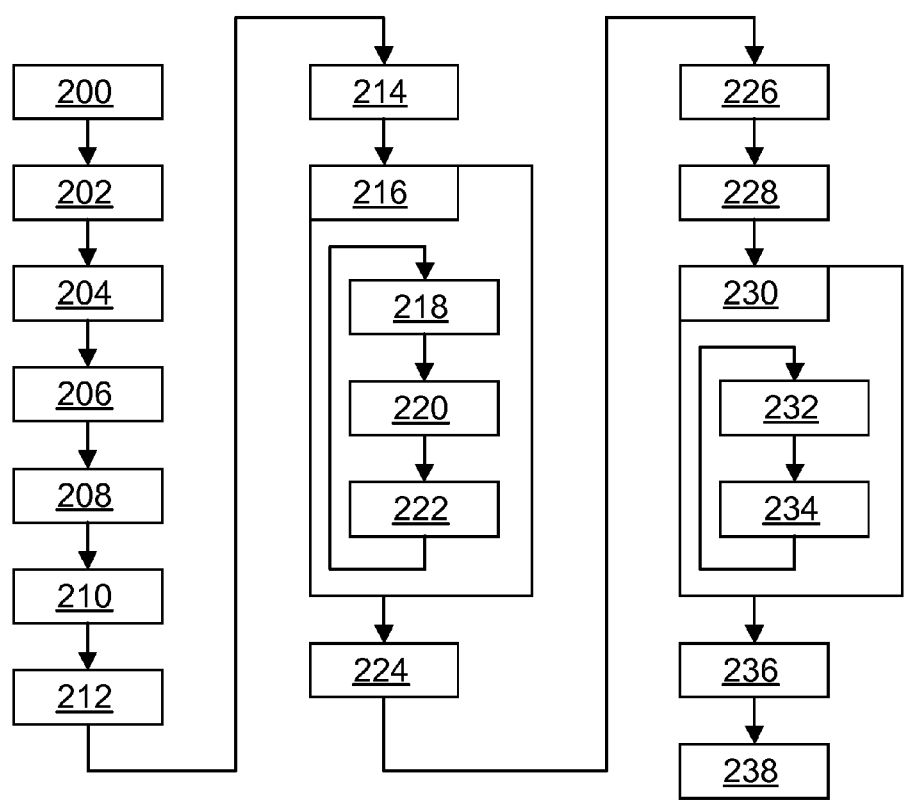
FIG. 2 shows the successive steps of a method for configuring the IT system of FIG. 1, according to an embodiment of the invention.

In reference to FIG. 2, we will now describe the operation of the computer 100. For the sake of simplicity, the aforementioned programs 118, 120 and 122 being executed, which are then processes, will include the reference of the program from which they have come and will be designated in the same way, i.e., respectively, BIOS 118, operating system 120 and shell-script 122.

In a step 200, the computer 100 is turned on.

In a step 202, the BIOS 118 is executed by the computer 100, with the BIOS 118 being configured so as to start each computing core 116 in hyper-threading mode.

Thus, in a step 204, the BIOS 118 starts two logic processors for each computing core 116, so that the computer 100 has sixteen logic processors in the example described.

In a step 206, the BIOS 118 creates, in the MADT table, the list of logic processors present, i.e. in the present case, of the sixteen logic processors started.

In a step 208, the BIOS 118 launches the operating system 120.

In a step 210, the operating system 120 reads, in the MADT table, the list of logic processors present.

In a step 212, the operating system 120 places all of the logic processors present in a list of logic processors available for scheduling, i.e. for distribution of the instruction threads between the processors of this list.

The "list of logic processors available for scheduling" should be understood as meaning any data set indicating, for each logic processor present in the MADT list, whether this logic processor should be used for the scheduling. The format of this data set is not therefore necessarily a data structure format in a "list".

After this step 212, the computer 100 is thus configured by default in hyper-threading mode, in which the operating system 120 schedules the instruction threads between all of the logic processors present, i.e. between all of the logic processors of all of the computing cores 116 of the processors 108.

The instruction threads come, for example, from daemons started by the operating system 120 or application programs started by the user via the human-machine interface 104.

The computer 100 is in particular capable of optimally executing the programs optimized for the hyper-threading mode.

The user then wishes, for example, to launch a program, recorded in the storage memory 114, which is optimized not for the hyper-threading mode, but for the single-threading mode.

In this case, in a step 214, the user launches the shell-script 122 by means of the human-machine interface 104 to go into so-called "simulated single-threading" mode. For example, this user types "ht off" in response to a shell prompt.

In a step 216, the shell-script 122 then configures the operating system 120 being executed so that it provides each computing core 116 with a maximum of one instruction thread at a time, in spite of the fact that, owing to their hyper-threading configuration mode by the BIOS 118, the computing cores 116 are able to execute two instruction threads at a time. This is what is called "simulated single-threading" in the present description.

To this end, the shell-script 122 provides an instruction to the operating system 120 being executed to remove all of the logic processors except one of each computing core 116 from the list of logic processors available for scheduling.

In the present case, as the ACPI standard specifies that the first logic processor of each computing core 116 must appear first in the list of processors present, the shell-script 122 performs step 216 by providing an instruction to the operating system 120 to remove, from the list of logic processors available for scheduling, the logic processors of which the position in the list of logic processors present is greater than the number of computing cores 116 of the computer 100. In the case of hyper-threading, it concerns the logic processors that are positioned in the second half of the list of logic processors present.

In the example described, the shell-script 122 provides an instruction to remove, from the list of processors available for successive scheduling, each processor of the second half of the list of processors present.

It should be noted that the shell-script 122 can be used for any number of computing cores (and not only eight as in the example described) as soon as each of these computing cores 116 is configured from the BIOS 118 in hyper-threading mode.

The shell-script 122 provides an instruction to remove a logic processor. For a Linux operating system, this is performed by writing the value 0 in the file specific to the processor numbered X:/sys/devices/system/cpu/cpuX/online.

In response, the operating system 120 executes, successively for each logic processor that has to be removed from the list of logic processors available for scheduling, a series of steps 218, 220 and 222.

In step 218, the operating system 120 migrates the interruptions and the processes executed by a logic processor that has to be removed from the list of logic processors available for scheduling to other logic processors on this list.

In step 220, the operating system 120 stops the daemons specific to the logic processor that has to be removed.

In a step 222, the operating system 120 removes this logic processor from the list of processors available for scheduling, so that no more instruction threads are provided to it by the operating system 120.

When steps 218, 220 and 222 have been executed for all of the logic processors that have to be removed, the computer 100 is configured in simulated single-threading mode, so that the operating system 120 schedules all of the instruction threads on the logic processors of the first half of the list of logic processors present, i.e. only on the first logic processor of each computing core 116. Thus, each computing core 116 only executes a maximum of one single instruction thread at a time.

The user can thus launch, in a step 224, the program optimized for single-threading mode, which is executed, in a step 226, with high performance, in spite of the configuration of the computing cores 116 in hyper-threading mode.

If, now, the user wishes to launch a program, for example recorded in the storage memory 114, that is optimized not for the single-threading mode but for the hyper-threading mode, it launches, in a step 228, the shell-script 122 by means of the human-machine interface 104 so as to return to "hyper-threading" mode. For example, this user types "ht on" upon a shell prompt.

In a step 230, the shell-script 122 then configures the operating system 120 being executed so that it can provide each computing core 116 with more than one instruction thread at a time.

To this end, the shell-script 122 provides an instruction to the operating system 120 being executed to add, to the list of logic processes available, all of the logic processors having been removed after step 216.

More specifically, in the example described, the shell-script 122 provides an instruction to successively add each logic processor appearing in the second part of the list of logic processors present.

In the example described, the shell-script 122 provides an instruction to add a logic processor. For a Linux operating system, this is done by writing the value 1 in the file specific to the processor numbered X:/sys/devices/system/cpu/cpuX/online.

In response, the operating system 120 executes, successively for each logic processor that has to be added to the list of processors available for scheduling, a series of steps 232 and 234.

In step 232, the operating system 120 adds a logic processor that has been removed after step 216 to the list of processors available for scheduling.

In step 234, the operating system 120 starts the daemons specific to the logic processor added to the previous step.

When steps 232 and 234 have been executed for all of the logic processors that have to be added, the computer 100 is configured in hyper-threading mode, so that the operating system 120 schedules the new instruction threads between all of the logic processors of all of the computing cores 116 of the processors 108.

The user can thus launch, in a step 236, the program optimized for the hyper-threading mode, which will be executed, in a step 238, with high performance.

The applications and services that dynamically take into account the number of logic processors available are automatically adapted to the new situation. The others are restarted, either manually by the user or by providing instructions in the shell-script 122 for restarting them.

More generally, in the embodiment shown in FIG. 2, when the computer 100 is configured in hyper-threading mode, steps 214 to 222 must be executed in order to configure it in simulated single-threading mode, and when the computer 100 is configured in simulated single-threading mode, steps 228 to 234 must be executed in order to configure it in hyper-threading mode.

It clearly appears that the invention is advantageous in that it makes it possible to execute, successively and effectively, two programs optimized for different modes, without requiring the computer 100 to be restarted.

It should also be noted that the invention is not limited to the embodiment described above. Indeed, a person skilled in the art will realize that various modifications may be made to the embodiment described above, in light of the teaching disclosed above.

In particular, the operating system might be designed so as to start by default in simulated single-threading mode.

A first way of doing this might be to modify the operating system so that, in step 212, the latter does not add all of the logic processors present, but only a single one for each computing core 116, for example by adding only the logic processors of the first half of the list of processors present.

A second way of doing this might be to have the shell-script 122 automatically executed by the operating system 120, for example before the user takes control, i.e. before the user can launch the programs or use the functions of the operating system.

Finally, it is possible to envisage implementing a new system service the function of which would be to activate the chosen mode. This would be started or stopped either manually or automatically upon each system runlevel change.

In addition, according to the invention, program types other than a shell-script can implement steps 216 to 222 and/or 230 to 234. In particular, these steps might be implemented by executing an executable binary program. Thus, this program constitutes a command enabling the user to implement the previous steps. In addition, they can be implemented by a library function called by a program, for example an application program, via a so-called API (Application Programming Interface). Thus, it would be possible to design a program optimized in one of the two modes that, as soon as it is launched, would call this function so as to configure the computer 100 in the mode promoting its execution.

In addition, in step 216, the shell-script 122 might give an instruction to remove, from the list of processors available for scheduling, the processors of the first half of the list of processors present. However, certain programs that consider the first logic processors still to be available would have the risk of no longer working.

In addition, the program implementing steps 216 to 222 and/or 230 to 243 might not use the numbering of the logic processors, but instead detect which correspond to a second logic processor of a core in multi-threading mode in order to activate or deactivate them. This detection can, for example, be performed using indications of the MADT table. This way of working is advantageous, for example, when the numbering of the logic processors in the MADT table does not comply with the APIC standard, or when the operating system does not take it into account.

In the claims below, the terms used must not be interpreted as limiting the claims to the embodiment disclosed in the present description, but must be interpreted as including all equivalents that the claims are intended to cover by means of their wording and that a person skilled in the art can produce by applying general knowledge to the embodiment of the teaching disclosed.

Annex: shell-script code 122

```
#    ht: script for going from the hyper-threading mode
#    to the simulated single-threading mode and the reverse
usage( ) {
    echo "Usage: ht [on | off]"
    echo "ht on    # activates the hyper-threading mode"
    echo "ht off   # deactivates the hyper-threading mode "
}
set_ht( ) {
    # recording in NB the number
    # of processors present
    cd /sys/devices/system/cpu
    NB=`ls -d cpu* | wc -w`
    # recording in NCORES the number of the last
    # processor of the first half
    # of processors present
    NCORES=`expr $NB / 2`
    # running through the processors present
    ls -d cpu* | while read i
    do
        # recording in N the number of the processor
        # present in progress
        N=`echo $i | sed s/cpu//`
        # if the processor present in progress is in
        # the first half of the list
        # of processors present, then go on
        # to the next processor present
        if [ "$N" -lt "$NCORES" ]
        then
            continue
            # otherwise, record in the file specific to the
            # processor present in progress, the value 1 if
            # "ht on" is launched, or the value 0 if
            # "ht off" is launched
        fi
        echo $1 > $i/online
    done
}
if [ "$1" = "on" ]
then
    set_ht 1
else
    if [ "$1" = "off" ]
    then
```

-continued

Annex: shell-script code 122

```
        set_ht 0
    else
        usage
        exit 2
    fi
fi
```

The invention claimed is:

1. A method for configuring a computer system, the computer system including one or more computing cores for executing instruction threads, in which the one or more computing cores is initially configured in a simultaneous multi-threading mode for executing at least two instruction threads at a time in an interlaced manner, and an operating system providing instruction threads to each of the one or more computing cores, the method for configuring a computer system comprising:

executing the operating system on the computer system; and dynamically configuring the computer system, while the operating system is being executed on the computer system, in a first mode in which an instruction is sent to the operating system so that the operating system provides, to each of the one or more computing cores, a maximum of one instruction thread at a time, while each of the one or more computing cores remains configured in the simultaneous multi-threading mode, wherein each of the one or more computing cores is designed so as to provide the operating system being executed with as many logic processors as there are instruction threads that each of the one or more computing cores can execute at a time in an interlaced manner, wherein the operating system being executed comprises a list of logic processors available for scheduling the instruction threads, in which list all of the logic processors of each of the one or more computing cores are located, and wherein the method further comprises, for configuring the operating system being executed so that the operating system provides each of the one or more said computing cores with a maximum of one instruction thread at a time, a step of transmitting, to the operating system being executed, an instruction to remove all of the logic processors except for one of each of the one or more computing cores from the list of logic processors available for scheduling.

2. The method for configuring a computer system according to claim 1, further comprising:

while the computer system, on which the operating system is being executed, is configured in the first mode, in which the operating system is instructed to provide each of the one or more computing cores with a maximum of one instruction thread at a time, configuring the computer system in a second mode, different from the first mode, by sending an instruction to the operating system so that the operating system provides, to each of the one or more computing cores, more than one instruction thread at a time.

3. The method for configuring a computer system according to claim 2, further comprising:

for configuring the computer system in the mode wherein the operating system provides each of the one or more computing cores with more than one instruction thread at a time, a step of transmitting, to the operating system being executed, an instruction to add, to the list of logic processors available for scheduling, all of the logic processors that were removed from it.

4. The method for configuring a computer system according to claim 1, wherein the computer system comprises, as a computing core or cores, only one or more of said computing cores configured in the simultaneous multi-threading mode.

5. The method for configuring a computer system according to claim 1, wherein each of the one or more computing cores is configured in the simultaneous multi-threading mode so as to be capable of executing exactly two instruction threads at a time in an interlaced manner.

6. A non-transitory computer-readable medium upon which is embodied a sequence of programmed instructions capable of being executed by a processor that, when executed by said processor, cause said processor to perform steps of a configuration method for configuring a computer system,
wherein said computer system includes:
one or more computing cores for executing instruction threads, wherein each of the one or more computing cores is initially configured in a simultaneous multi-threading mode for executing at least two instruction threads at a time in an interlaced manner, and
an operating system, which provides instruction threads to each of the one or more computing cores,
the method comprising:
executing the operating system on the computer system and
dynamically configuring the computer system, while the operating system is being executed on the computer system, in a first mode in which an instruction is sent to the operating system so that the operating system provides, to each of the one or more computing cores, a maximum of one instruction thread at a time, while each said of the one or more computing cores remains configured in the simultaneous multi-threading mode,
wherein each of the one or more computing cores is designed so as to provide the operating system being executed with as many logic processors as there are instruction threads that each of the one or more computing cores can execute at a time in an interlaced manner,
wherein the operating system being executed comprises a list of logic processors available for scheduling the instruction threads, in which list all of the logic processors of each of the one or more computing cores are located, and
wherein the method further comprises, for configuring the operating system being executed so that the operating system provides each of the one or more said computing cores with a maximum of one instruction thread at a time, a step of transmitting, to the operating system being executed, an instruction to remove all of the logic processors except for one of each of the one or more computing cores from the list of logic processors available for scheduling.

7. The non-transitory computer-readable medium according to claim 6, wherein said instructions are provided in the form of a shell-script.

8. The non-transitory computer-readable medium according to claim 6, wherein said instructions are provided in the form of at least one function of a computer library intended to be called by another program.

9. A computer system comprising:
one or more computing cores for executing instruction threads, wherein each of the one or more computing cores is initially configured in a simultaneous multi-threading mode for executing at least two instruction threads at a time in an interlaced manner;
a memory in which an operating system is stored, wherein said operating system, when executed by the computer system, provides instruction threads to each of the one or more computing cores; and
a memory in which a sequence of programmed instructions is stored, said instructions including instructions which, when executed by the computer system while the operating system is being executed by the computer system, dynamically configure the computer system in a first mode in which an instruction is sent to the operating system so that the operating system provides each of the one or more computing cores with a maximum of one instruction thread at a time, while each of the one or more computing cores remains configured in the simultaneous multi-threading mode,
wherein each of the one or more computing cores is designed so as to provide the operating system being executed with as many logic processors as there are instruction threads that each of the one or more computing cores can execute at a time in an interlaced manner,
wherein the operating system being executed comprises a list of logic processors available for scheduling the instruction threads, in which list all of the logic processors of each of the one or more computing cores are located, and
wherein, for configuring the operating system being executed so that the operating system provides each of the one or more said computing cores with a maximum of one instruction thread at a time, an instruction to remove all of the logic processors except for one of each of the one or more computing cores from the list of logic processors available for scheduling is transmitted to the operating system being executed.

* * * * *